US012701040B2

(12) United States Patent
Agrawal et al.

(10) Patent No.: US 12,701,040 B2
(45) Date of Patent: Aug. 4, 2026

(54) DECOUPLING TRANSMITTER FROM LOOPBACK PATH IQMM WITH PHASE DELAY-ELIMINATION BY ROTATION

(71) Applicant: TEXAS INSTRUMENTS INCORPORATED, Dallas, TX (US)

(72) Inventors: Prakhar Agrawal, Bangalore (IN); Sucheth Kuncham, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 18/338,895

(22) Filed: Jun. 21, 2023

(65) Prior Publication Data

US 2023/0421428 A1     Dec. 28, 2023

(30) Foreign Application Priority Data

Jun. 27, 2022     (IN) .............................. 202241036644

(51) Int. Cl.
*H04L 27/36*             (2006.01)

(52) U.S. Cl.
CPC ................................... *H04L 27/364* (2013.01)

(58) Field of Classification Search
CPC ..... H04L 27/0002; H04L 27/02; H04L 27/04; H04L 27/06; H04L 27/18; H04L 27/20; H04L 27/22; H04L 27/34; H04L 27/36; H04L 27/364; H04L 27/366; H04L 27/38
USPC .............. 375/219, 220, 222, 261, 268, 269, 375/279–281, 297, 298, 300, 308; 455/84, 86, 88, 108, 114.3
See application file for complete search history.

(56) References Cited

U.S. PATENT DOCUMENTS

| | | | |
|---|---|---|---|
| 10,389,561 B2 | 8/2019 | Erez et al. | |
| 2007/0213022 A1* | 9/2007 | Darabi ..................... | H04B 1/40 |
| | | | 455/232.1 |
| 2010/0027689 A1* | 2/2010 | Kohlmann ............ | H04L 27/368 |
| | | | 375/295 |
| 2010/0104045 A1* | 4/2010 | Santraine ............... | H03D 3/009 |
| | | | 375/324 |
| 2011/0158297 A1* | 6/2011 | Ding ....................... | H03D 3/009 |
| | | | 375/219 |
| 2012/0213266 A1* | 8/2012 | Su .......................... | H04B 17/21 |
| | | | 375/226 |

(Continued)

*Primary Examiner* — Young T. Tse

(74) *Attorney, Agent, or Firm* — Michelle F. Murray; Frank D. Cimino

(57)     ABSTRACT

In an example, a system includes a transmitter configured to transmit a quadrature amplitude modulation (QAM) signal, where the QAM signal includes an in-phase (I) chain signal and a quadrature (Q) chain signal. The system includes a receiver configured to receive the QAM signal from the transmitter. The system includes a delay element configured to introduce a phase delay between the transmitter and the receiver. The system includes a controller configured to determine an IQ mismatch (IQMM) of a transmitter-receiver loop without a phase delay, and to determine an IQMM of the transmitter-receiver loop with a phase delay introduced by the delay element. The controller is configured to determine an IQMM of the transmitter based on the IQMM of the transmitter-receiver loop without the phase delay and the IQMM of the transmitter-receiver loop with the phase delay. The controller is configured to correct the IQMM of the transmitter.

23 Claims, 5 Drawing Sheets

500

510 — TRANSMITTING A QUADRATURE AMPLITUDE MODULATION (QAM) SIGNAL WITH A TRANSMITTER, WHERE THE QAM SIGNAL INCLUDES AN IN-PHASE (I) CHAIN SIGNAL AND A QUADRATURE (Q) CHAIN SIGNAL

520 — RECEIVING THE QAM SIGNAL AT A RECEIVER, WHERE THE RECEIVER AND THE TRANSMITTER FORM A TRANSMITTER-RECEIVER LOOP

530 — DETERMINING AN I-Q MISMATCH (IQMM) OF THE TRANSMITTER-RECEIVER LOOP WITHOUT A PHASE DELAY

540 — DETERMINING AN IQMM OF THE TRANSMITTER-RECEIVER LOOP WITH A PHASE DELAY, THE PHASE DELAY INTRODUCED BY A DELAY ELEMENT

550 — DETERMINING AN IQMM OF THE TRANSMITTER BASED ON THE IQMM OF THE TRANSMITTER-RECEIVER LOOP WITHOUT THE PHASE DELAY AND THE IQMM OF THE TRANSMITTER-RECEIVER LOOP WITH THE PHASE DELAY

560 — CORRECTING THE IQMM OF THE TRANSMITTER

(56)               References Cited

U.S. PATENT DOCUMENTS

| | | | |
|---|---|---|---|
| 2013/0058387 A1* | 3/2013 | Muhammad | H04B 15/04 |
| | | | 375/222 |
| 2015/0195050 A1* | 7/2015 | Kim | H04B 17/14 |
| | | | 375/221 |
| 2016/0036486 A1* | 2/2016 | Sestok, IV | H04L 7/0331 |
| | | | 455/77 |
| 2016/0182162 A1* | 6/2016 | Belitzer | H04L 7/033 |
| | | | 375/261 |
| 2016/0359614 A1* | 12/2016 | Hao | H04L 7/0087 |
| 2019/0036749 A1* | 1/2019 | Erez | H04L 27/2646 |
| 2019/0149376 A1* | 5/2019 | Dai | H04B 1/00 |
| | | | 375/329 |
| 2019/0386869 A1* | 12/2019 | Dao | H03D 3/009 |
| 2021/0377095 A1* | 12/2021 | Nayebi | H04L 27/148 |
| 2022/0303025 A1* | 9/2022 | Cheng | H04B 17/11 |
| 2023/0057043 A1* | 2/2023 | Tseng | H04B 17/11 |

* cited by examiner

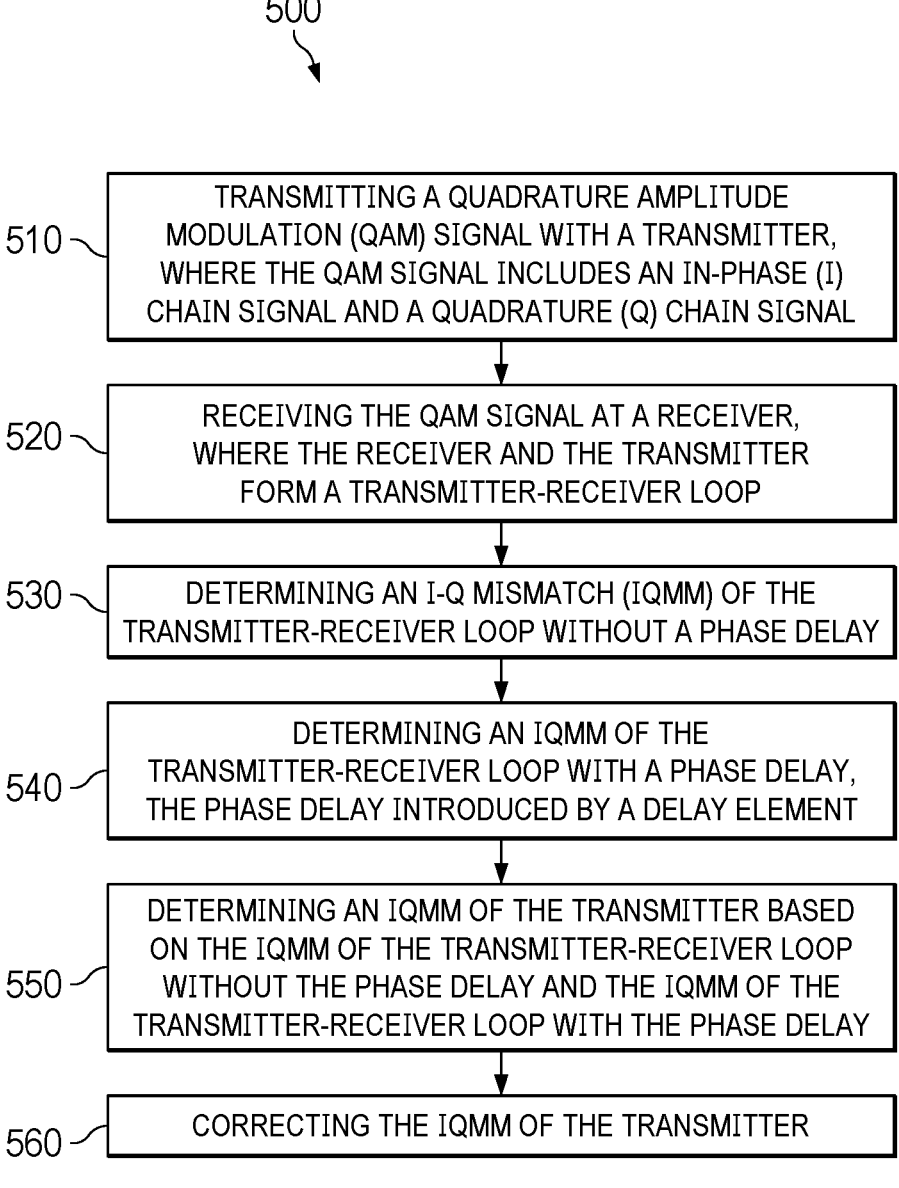

500

510 — TRANSMITTING A QUADRATURE AMPLITUDE MODULATION (QAM) SIGNAL WITH A TRANSMITTER, WHERE THE QAM SIGNAL INCLUDES AN IN-PHASE (I) CHAIN SIGNAL AND A QUADRATURE (Q) CHAIN SIGNAL

520 — RECEIVING THE QAM SIGNAL AT A RECEIVER, WHERE THE RECEIVER AND THE TRANSMITTER FORM A TRANSMITTER-RECEIVER LOOP

530 — DETERMINING AN I-Q MISMATCH (IQMM) OF THE TRANSMITTER-RECEIVER LOOP WITHOUT A PHASE DELAY

540 — DETERMINING AN IQMM OF THE TRANSMITTER-RECEIVER LOOP WITH A PHASE DELAY, THE PHASE DELAY INTRODUCED BY A DELAY ELEMENT

550 — DETERMINING AN IQMM OF THE TRANSMITTER BASED ON THE IQMM OF THE TRANSMITTER-RECEIVER LOOP WITHOUT THE PHASE DELAY AND THE IQMM OF THE TRANSMITTER-RECEIVER LOOP WITH THE PHASE DELAY

560 — CORRECTING THE IQMM OF THE TRANSMITTER

FIG. 5

DECOUPLING TRANSMITTER FROM LOOPBACK PATH IQMM WITH PHASE DELAY-ELIMINATION BY ROTATION

CROSS-REFERENCE TO RELATED APPLICATIONS

The present application claims priority to Indian Provisional Patent Application No. 202241036644, which was filed Jun. 27, 2022, is titled "A NOVEL METHOD OF DECOUPLING TRANSMITTER FROM LOOPBACK PATH IQMM BY USING PHASE DELAY-ELIMINATION BY ROTATION," and is hereby incorporated herein by reference in its entirety.

BACKGROUND

Radio architectures may use a carrier signal to transmit an information-bearing input signal. Orthogonal frequency-division multiplexing (OFDM) is a multi-carrier modulation system where data is transmitted as a combination of orthogonal narrowband signals known as subcarriers. Each subcarrier may be modulated with quadrature amplitude modulation (QAM). The quality of the transmitted signal is assessed through a parameter called error vector magnitude (EVM). Impairments such as non-linearity, phase noise, or transmitter and receiver in-phase (I) and quadrature (Q) mismatch (IQMM) may degrade the EVM.

SUMMARY

In accordance with at least one example of the description, a system includes a transmitter configured to transmit a QAM signal, where the QAM signal includes an in-phase (I) chain signal and a quadrature (Q) chain signal. The system includes a receiver configured to receive the QAM signal from the transmitter. The system also includes a delay element configured to introduce a phase delay between the transmitter and the receiver. The system includes a controller configured to determine an IQMM of a transmitter-receiver loop without a phase delay. The controller is configured to determine an IQMM of the transmitter-receiver loop with a phase delay, the phase delay introduced by the delay element. The controller is also configured to determine an IQMM of the transmitter based on the IQMM of the transmitter-receiver loop without the phase delay and the IQMM of the transmitter-receiver loop with the phase delay. The controller is configured to correct the IQMM of the transmitter.

In accordance with at least one example of the description, a system includes a transmitter having a first in-phase (I) signal chain, a first quadrature (Q) signal chain, a first mixer, and an amplifier. The system includes a receiver coupled to the transmitter, where the receiver includes a second mixer, a second I signal chain, and a second Q signal chain, where the transmitter and the receiver form a transmitter-receiver loop, and where the receiver is configured to receive a signal from the transmitter and provide a feedback signal to the transmitter. The system includes a delay element configured to introduce a phase delay between the transmitter and the receiver. The system also includes a controller configured to receive the feedback signal and determine an IQMM of the transmitter based at least in part on the phase delay.

In accordance with at least one example of the description, a method includes transmitting a QAM signal with a transmitter, where the QAM signal includes an in-phase (I) chain signal and a quadrature (Q) chain signal. The method also includes receiving the QAM signal at a receiver, where the receiver and the transmitter form a transmitter-receiver loop. The method includes determining an I-Q mismatch (IQMM) of the transmitter-receiver loop without a phase delay. The method also includes determining an IQMM of the transmitter-receiver loop with a phase delay, the phase delay introduced by a delay element. The method includes determining an IQMM of the transmitter based on the IQMM of the transmitter-receiver loop without the phase delay and the IQMM of the transmitter-receiver loop with the phase delay. The method includes correcting the IQMM of the transmitter.

BRIEF DESCRIPTION OF THE DRAWINGS

FIG. 5 is a flow diagram of a method for estimating and correcting IQMM of a transmitter in accordance with various examples.

The same reference numbers or other reference designators are used in the drawings to designate the same or similar (functionally and/or structurally) features.

DETAILED DESCRIPTION

QAM is a modulation method for transmitting information. QAM conveys two message signals by modulating the amplitude of two carrier waves. The two carrier waves have the same frequency but are out of phase with one another by 90°, which is called orthogonality or quadrature. One of the waves is referred to as the in-phase (I) signal (I chain), and the other is referred to as the quadrature (Q) signal (Q chain). The transmitted signal is created by adding the two carrier waves together. At a receiver, the two waves may be separated (e.g., demodulated) because of their orthogonality.

The differences in the I and Q transmitter (Tx) paths cause a mismatch, called IQMM. The IQMM causes an error, and compensation may be performed to correct for the error. Many impairments are in the frequency domain, and can be solved by using fast Fourier transforms (FFTs). However, FFTs are computationally complex. Also, an auxiliary receiver (AuxRx) that receives the transmitted signal and provides feedback may add its own IQMM.

To correct for IQMM, examples herein perform estimation of the impairments in the time domain on the OFDM packets. The time domain approach is performed on the Tx/AuxRx loop to estimate the IQMM of the loop ($v_{loop}$) using an indirect adaptive algorithm. This $v_{loop}$ contains both Tx IQMM as well as AuxRx IQMM. To decouple the Tx and AuxRx IQMM, different phase delays are added (e.g., adding a delay in the AuxRx clock with respect to the Tx clock) between the transmitter mixer and the AuxRx mixers. The phase delays allow the Tx IQMM and the AuxRx IQMM to be separated from the Tx/AuxRX loop IQMM. A first iteration of the process estimates the Tx/AuxRx loop IQMM ($v_{loop1}$) using a normal obtained phase delay. A second iteration estimates the Tx/AuxRx loop IQMM ($v_{loop2}$) after adding a rotation or phase delay. Then, a set of equations is solved to estimate Tx IQMM ($\mu_{Tx}$). The solution described herein is immune to AuxRx IQMM and to frequency dependent IQMM (IQFD).

The phase delays or rotations may be achieved using any suitable techniques. A delay element may be useful for producing a phase delay in a clock or signal path. As an example, a phase delay may be achieved by changing the clock generation phase of the AuxRx. In another example, a phase delay may be achieved by phase shifting the signal at the load of the transmitter amplifier in the Tx path. In another example, a phase delay may be achieved by adding an intentional delay in the AuxRx path, in either a signal path or a clock path.

Figure 1:
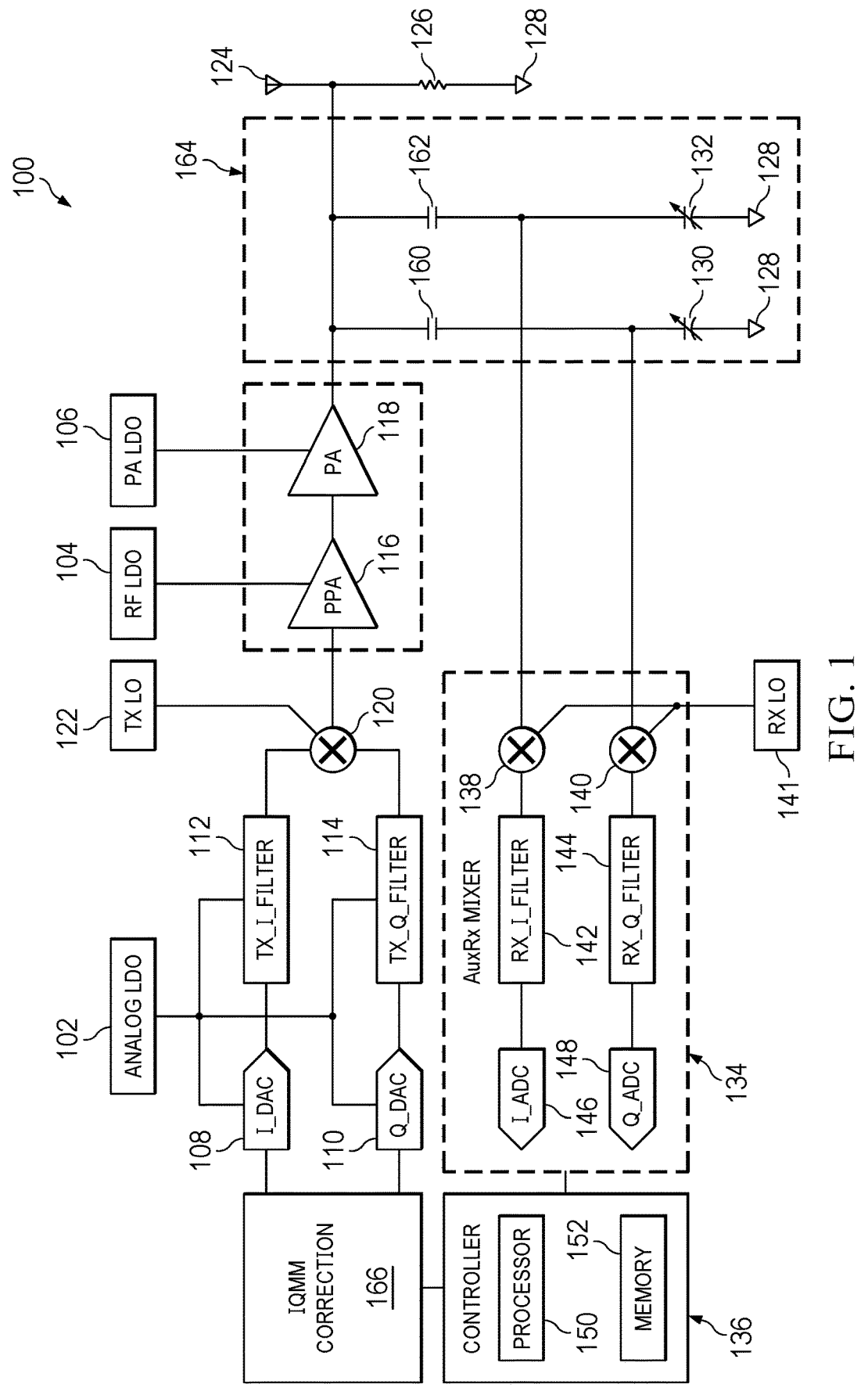
FIG. 1 is a block diagram of a transmitter and auxiliary receiver in accordance with various examples.

FIG. 1 is a block diagram of a transmitter and auxiliary receiver system 100 in accordance with various examples. System 100 includes some components of a transmitter and auxiliary receiver, but other systems may include components or circuitry that is not shown here for simplicity. System 100 includes low-dropout (LDO) voltage regulators 102, 104, and 106. Analog LDO 102 provides a supply voltage to the transmit analog components 108, 110, 112, and 114, which are described below. RF LDO 104 provides a supply voltage to pre-power amplifier (PPA) 116. PA LDO 106 provides a supply voltage to power amplifier (PA) 118.

The transmitter portion of system 100 includes digital-to-analog converter (DAC) 108 (I_DAC) for the I chain and DAC 110 (Q_DAC) for the Q chain. DAC 108 is coupled to I chain filter 112 (TX_I_FILTER), and DAC 110 is coupled to Q chain filter 114 (TX_Q_FILTER). I chain filter 112 and Q chain filter 114 are coupled to TX mixer 120. TX mixer 120 is also coupled to TX local oscillator (TX LO) 122. An output of TX mixer 120 is coupled to PPA 116. An output of PPA 116 is coupled to PA 118. An output of PA 118 is coupled to antenna 124. Antenna 124 is represented with a load 126 coupled to ground 128. Antenna 124 may also be coupled to variable capacitors 130 and 132, which are each coupled to ground 128. Antenna 124 may also be coupled to capacitors 160 and 162 in one example. Capacitors 130, 132, 160, and 162 form an attenuator network 164 (e.g., capacitor attenuator 164) in a loopback path that couples the transmitter to an auxiliary receiver (AuxRx) 134. Capacitors 130, 132, 160, and 162 attenuate the power of the output of PA 118 before the output is provided to the complex mixers in auxiliary receiver 134. In another example, other circuitry may attenuate the output of PA 118.

The components of system 100 described above are part of the transmitter path for system 100. The loopback path in this example includes the transmitter path and the auxiliary receiver 134. Auxiliary receiver 134 may include many other components not shown in FIG. 1, such as LOs, LDOs, and other circuitry. Auxiliary receiver 134 may be coupled to a controller 136 configured to perform the operations described herein. Auxiliary receiver 134 includes complex mixers 138 and 140. Complex mixer 138 is a complex mixer for the I chain, and complex mixer 140 is a complex mixer for the Q chain. Complex mixer 138 is coupled to I chain filter (RX_I_FILTER) 142, and complex mixer 140 is coupled to Q chain filter (RX_Q_FILTER) 144. A receive local oscillator (RX LO) 141 provides an LO signal to complex mixers 138 and 140 for mixing the signals. The RX LO 141 signal may be the same LO signal as the LO signal from TX LO 122 in one example. I chain filter 142 is coupled to I chain analog-to-digital converter (ADC) 146 (I_ADC). Q chain filter 144 is coupled to Q chain ADC 148 (Q_ADC).

In an example operation, a signal is transmitted in system 100 via the I chain and the Q chain. The message signal on the I chain passes through DAC 108, where the digital signal is converted to an analog signal. The analog signal on the I chain is received by I chain filter 112 and filtering is performed. Likewise, the message signal on the Q chain passes through DAC 110, where the digital signal is converted to an analog signal. The analog signal on the Q chain is received by Q chain filter 114. Both message signals (the I chain and the Q chain) are sent to TX mixer 120. The signals are mixed with a carrier signal from TX LO 122 by TX mixer 120. As described above, the I and Q message signals are out of phase with another by 90° in the signal provided by the TX mixer 120. The TX mixer 120 output signal that includes the I and Q message signals is then received by PPA 116 and PA 118, where the mixer 120 output signal is amplified before being transmitted via antenna 124. Tx IQMM may be added at I chain filter 112 and Q chain filter 114. In examples herein, Tx IQMM is estimated and corrected as described below.

Auxiliary receiver 134 receives a copy of the transmitted signal and provides the message signals therein to the controller 136 for use to compensate for the IQMM as described herein. In this way, auxiliary receiver 134 provides a feedback signal to the transmitter. The transmitter impairments are estimated and corrected with the techniques herein. Auxiliary receiver 134 includes two complex mixers 138 and 140. One complex mixer 138 receives and mixes the I chain, and the other complex mixer 140 receives and mixes the Q chain. Complex mixer 138 provides the I chain signal to I chain filter 142, and then the filtered I chain signal is provided to I chain ADC 146. I chain ADC 146 provides the I chain signal to controller 136. Complex mixer 140 provides the Q chain signal to Q chain filter 144, and then the filtered Q chain signal is provided to Q chain ADC 148. Q chain ADC 148 provides the Q chain signal to controller 136. AuxRx IQMM may be added by complex mixers 138 and 140, I chain filter 142, and Q chain filter 144. As described below, the IQMM of the Tx/AuxRx loop is estimated. Then, the IQMM of the Tx/AuxRx loop is estimated with a rotation or phase delay. A set of equations is solved to estimate the Tx IQMM. In an example described herein, the Tx IQMM estimation is immune to the AuxRx IQMM.

The controller 136 may produce a correction signal that is provided to the transmitter to correct for the Tx IQMM and other impairments. The correction signal may be supplied at an IQMM correction block 166, which provides the Tx IQMM correction signal to the inputs of DACs 108 and 110. IQMM correction block 166 may include any suitable hardware to receive a correction signal and provide the correction signal to the transmit chain. In other examples, the IQMM correction signal may be provided to other components in the transmit chain.

Controller 136 may include a processor 150 and memory 152 in one example. The memory 152 may include any suitable data, code, logic, or instructions. The processor 150 is configured to read and execute computer-readable instructions. For example, the processor 150 is configured to invoke and execute instructions in a program stored in the memory 152, including instructions. Instructions may perform the actions described herein, such as estimating and providing a correction for IQMM and other impairments.

In an example, the memory 152 may be integrated with the processor 150. The memory 152 is configured to store various software programs and/or multiple groups of instructions. In some examples, the memory 152 is configured to store the instructions for implementing some or all of the various methods and processes provided in accordance with the various examples of this description.

In another example, elements of controller 136 disclosed herein may use any combination of dedicated hardware and instructions stored in a non-transitory medium, such as the memory 152. The non-transitory medium includes all electronic mediums or media of storage, except signals. The processor 150 may include one or more microcontrollers, application-specific integrated circuits (ASICs), central processing units (CPUs), graphics processing units (GPUs), and/or other processing resources configured to execute instructions stored on the medium. Examples of suitable non-transitory computer-readable media include one or more flash memory devices, battery-backed random access memory (RAM), solid state drives (SSDs), hard disk drives (HDDs), optical media, and/or other memory devices suitable for storing the instructions for the processor 150.

Figure 2:
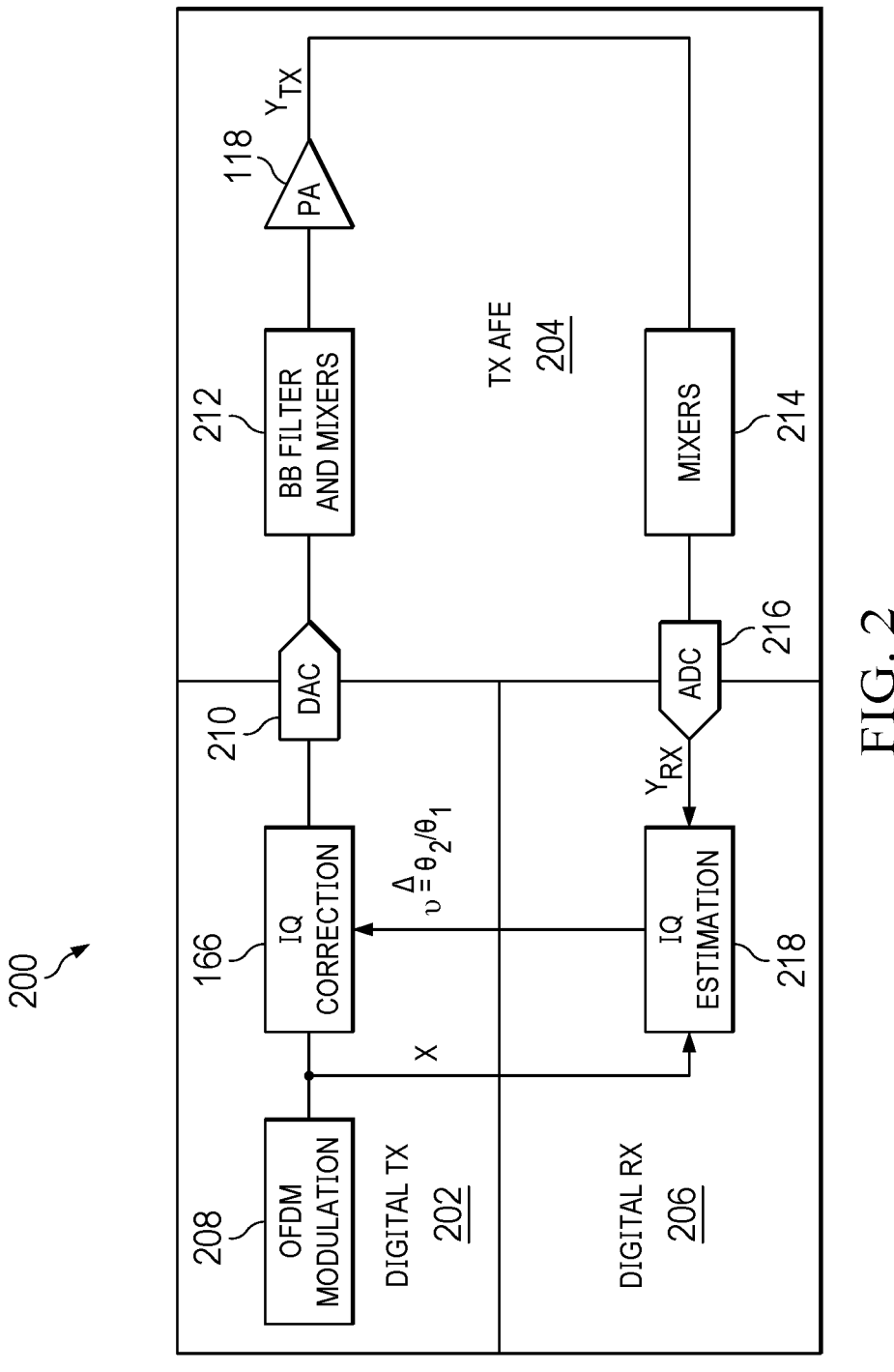
FIG. 2 is a block diagram of a transmitter and auxiliary receiver system in accordance with various examples.

FIG. 2 is a block diagram of a transmitter and auxiliary receiver system 200 in accordance with various examples. System 200 includes some components of a transmitter and auxiliary receiver, but other systems may include components or circuitry that is not shown here for simplicity. System 200 includes a digital TX section 202, an analog section 204, and a digital RX section 206. Digital TX section includes OFDM modulation block 208 and IQMM correction block 166. Analog section 204 includes a DAC 210, baseband (BB) filters and mixers 212, and PA 118. DAC 210 may be DACs 108 and 110 as described above. BB filters and mixers 212 may be filters 112, 114 and TX mixer 120 as described above. PA 118 may include PPA 116 in an example. Analog section 204 also includes BB filters and mixers 214 and ADC 216. BB filters and mixers 214 may include filters 142, 144 and mixers 138, 140 as described above. ADC 216 may include ADCs 146 and 148 as described above. BB filters and mixers 214 and ADC 216 may be part of the AuxRx path as described herein. Digital RX section 206 includes IQ estimation block 218.

In an example, the Tx IQMM is added at DAC 210, BB filters and mixers 212, and PA 118. The AuxRx path (e.g., the loopback path of BB filters and mixers 214 and ADC 216) may also add some AuxRx IQMM. Therefore, both paths add error to the signal. In examples herein, the error for the TX path is compensated for, not the error for the entire Tx/AuxRx path. The error is determined at the output signal $y_{TX}$ at the output of PA 118; the AuxRx path compensation is not needed in this example. Any error in the AuxRx path does not need to be corrected in some examples.

U.S. Pat. No. 10,389,561 B2 by Erez, et. al., (application Ser. No. 15/662,393), filed Jul. 28, 2017, describes a method for correcting IQ imbalance in a zero-IF (intermediate frequency) transceiver. U.S. Pat. No. 10,389,561 ("the '561 patent") is hereby incorporated herein by reference in its entirety. The method of the '561 patent can be used with a system, such as system 200, to estimate the image rejection ratio (IMRR) $\vartheta$ (also called the IQMM). The example method applies an iterative algorithm to estimate the IQMM of the entire Tx/AuxRx loop. In some such examples, the Tx IQMM is separated from the Tx/AuxRx loop IQMM using phase delays as described below. However, the technique therefore provides an overcorrection.

The transmitted signal $y_{TX}$ may be determined by a standard model in Equation (1):

$$y_{TX}(t)=Re\{y_{BB} \cdot e^{j\omega t}\} \qquad (1)$$

where $y_{BB}$ is a complex envelope baseband signal distorted with IQMM impairment. yBB is defined in Equation (2):

$$y_{BB}=Re(x) \cdot ae^{j\theta}+j \cdot IM(x) \qquad (2)$$

Equation (2) may be rewritten as Equation (3):

$$y_{BB} = ae^{j\theta} \cdot \frac{[x+x*]}{2} + \frac{[x-x^*]}{2} = x\frac{ae^{j\theta}+1}{2} + x^*\frac{ae^{j\theta}-1}{2} \qquad (3)$$

$y_{BB}$ may be shown as Equation (4):

$$y_{BB} \triangleq \alpha x+\beta x^* \qquad (4)$$

where $\theta$ represents the phase imbalance of the system and $\alpha$ represents the gain imbalance of the system. In an ideal system, $\alpha=1$ and $\theta=0$.

$y_{RX}$ (the signal received by digital RX section 206 in FIG. 2) is shown in Equation (5):

$$y_{RX}=y_{BB} \cdot G=G \cdot (\alpha x+\beta x^*) \qquad (5)$$

Equation (5) may be rewritten as Equation (6):

$$y_{RX} \triangleq \theta_1 x+\theta_2 x^* \qquad (6)$$

where G represents the complex gain of the RX path. The IQMM ratio can be determined using Equation (7):

$$\vartheta \triangleq \frac{\theta_2}{\theta_1} = \frac{\beta}{\alpha} \qquad (7)$$

The IMRR $\vartheta$ (e.g., IQMM) may be estimated and approximated by the following Equation (8):

$$\vartheta \cong \frac{\sum_{n=1}^{N} x_n \cdot y_{RX_n}}{\sum_{n=1}^{N} x_n^* \cdot y_{RX_n}} + \frac{\sum_{n=1}^{N} x_n^2}{\sum_{n=1}^{N} |x_n|^2} \qquad (8)$$

where X is the modem BB signal before impairment and correction, $x_n$ is the $n^{th}$ sample of X, and N is the packet length. $y_{RX}$ is the transmitted signal with IQMM impairment, received back and down-converted to BB, and $Y_{RX_n}$ the $n^{th}$ sample of $y_{RX}$. After $\vartheta$ is estimated by IQ estimation block 218, a correction signal may be applied by IQMM correction block 166.

In contrast, examples herein expand on this technique to provide better IQMM correction performance. Put another way, the technique of Equations 1-8 determines the error for the Tx/AuxRx loop, whereas examples that follow use a rotation or phase delay to decouple the Tx IQMM from the AuxRx IQMM.

Figure 3:
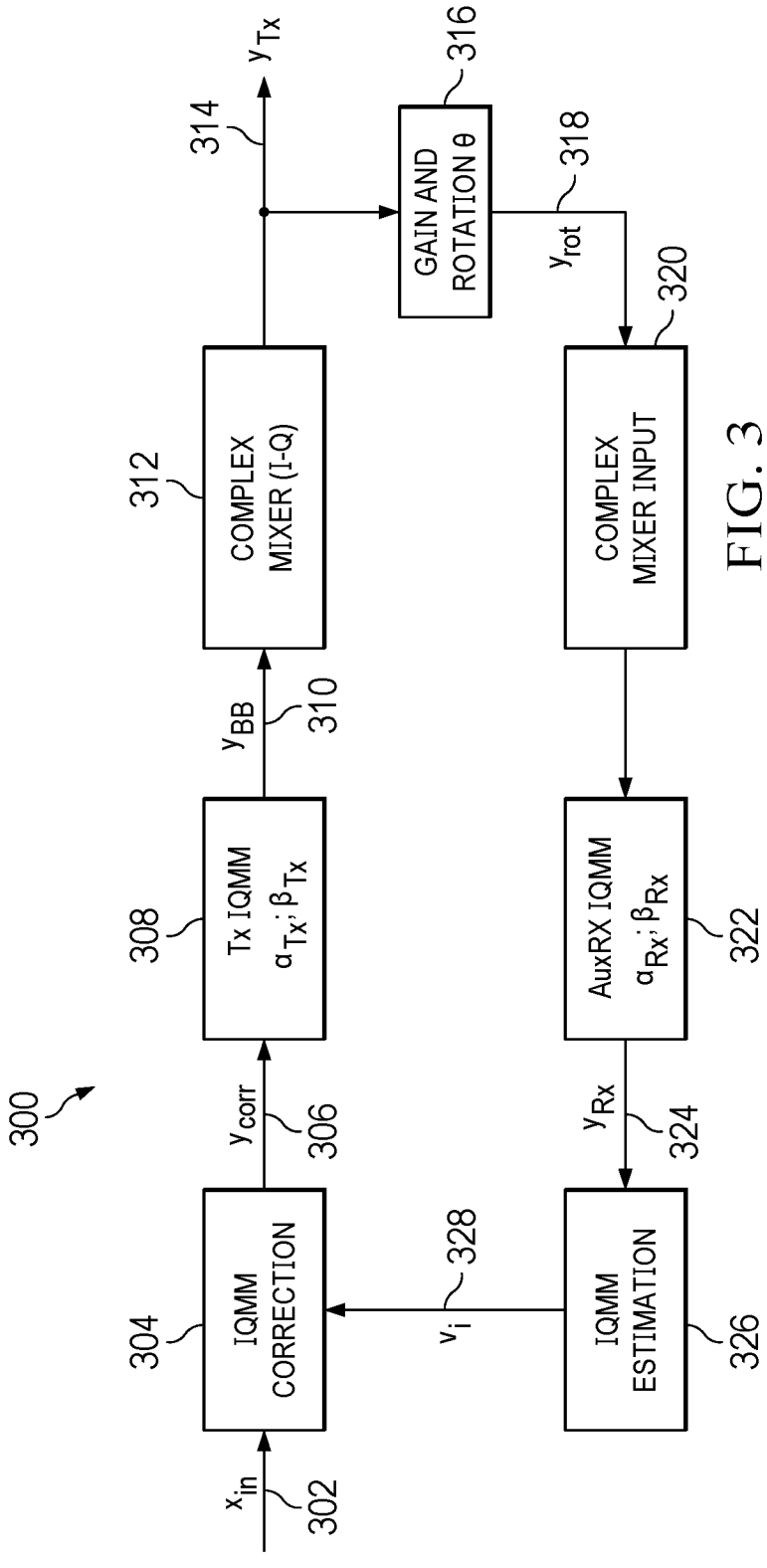
FIG. 3 is a block diagram of a transmit/auxiliary receiver system in accordance with various examples herein.

FIG. 3 is a block diagram of a transmit/auxiliary receiver system 300 in accordance with various examples herein. System 300 may be similar to system 100, and in some examples, system 300 is a representation of system 100. In that regard, some components in system 300 represent functions, and may be embodied in hardware, software, or may be performed by any suitable component, such as controller 136 or IQMM correction block 166.

In one example operation, a signal $x_{in}$ 302 to be transmitted receives IQ correction at IQMM correction 304 (which correspond to IQMM correction block 166 of FIG. 1) from the loopback loop, described below. IQMM correction 304 produces a corrected output signal $y_{corr}$ 306. Tx IQMM 308 represents the transmit IQMM, which may result from LDO 102, I_DAC 108, Q_DAC, 110, I chain filter 112, Q chain filter 114, and/or other transmitter elements, and which is corrected by $y_{corr}$ 306 from the loopback path. A signal $y_{BB}$ 310 (e.g., a baseband signal) is provided to a complex mixer 312 (e.g., mixer 120). The complex mixer 312 mixes the I and Q chain signals, and transmits the signals, where the transmitted signal is $y_{Tx}$ 314.

The other components in system 300 provide the loopback path for Tx IQMM estimation and correction using a phase delay or rotation. The transmitted signal $y_{Tx}$ 314 is provided to the auxiliary receiver 134 for correction. The transmitted signal $y_{Tx}$ 314 undergoes gain and rotation 316, which may result from attenuator network 164 and/or other network elements as the signal passes to the auxiliary receiver 134. The signal that results after gain and rotation is designated by $y_{rot}$ 318. $y_{rot}$ 318 is provided to complex mixer 320 (e.g., mixer 138 and/or mixer 140). In other examples, a rotation may be added elsewhere as described below. After the signals are mixed by complex mixer 320, AuxRx IQMM 322, which may result from RX_I_FILTER 142, RX_Q_FILTER 144, I_ADC 146, Q_ADC 148, and/or other receiver elements, is applied to the signals to produce a $y_{RX}$ 324 signal. $y_{RX}$ 324 is provided to IQMM estimation 326, where a controller or processor (e.g., controller 136) performs an IQMM estimation so the IQMM may be corrected. The process for performing IQMM estimation and correction is described below, and includes using the added phase delay or rotation to decouple the Tx IQMM from the AuxRx IQMM. After IQMM estimation is performed, a signal $v_i$ 328 is provided to IQMM correction 304 to correct Tx IQMM and other impairments in the transmitted signal.

Figure 4:
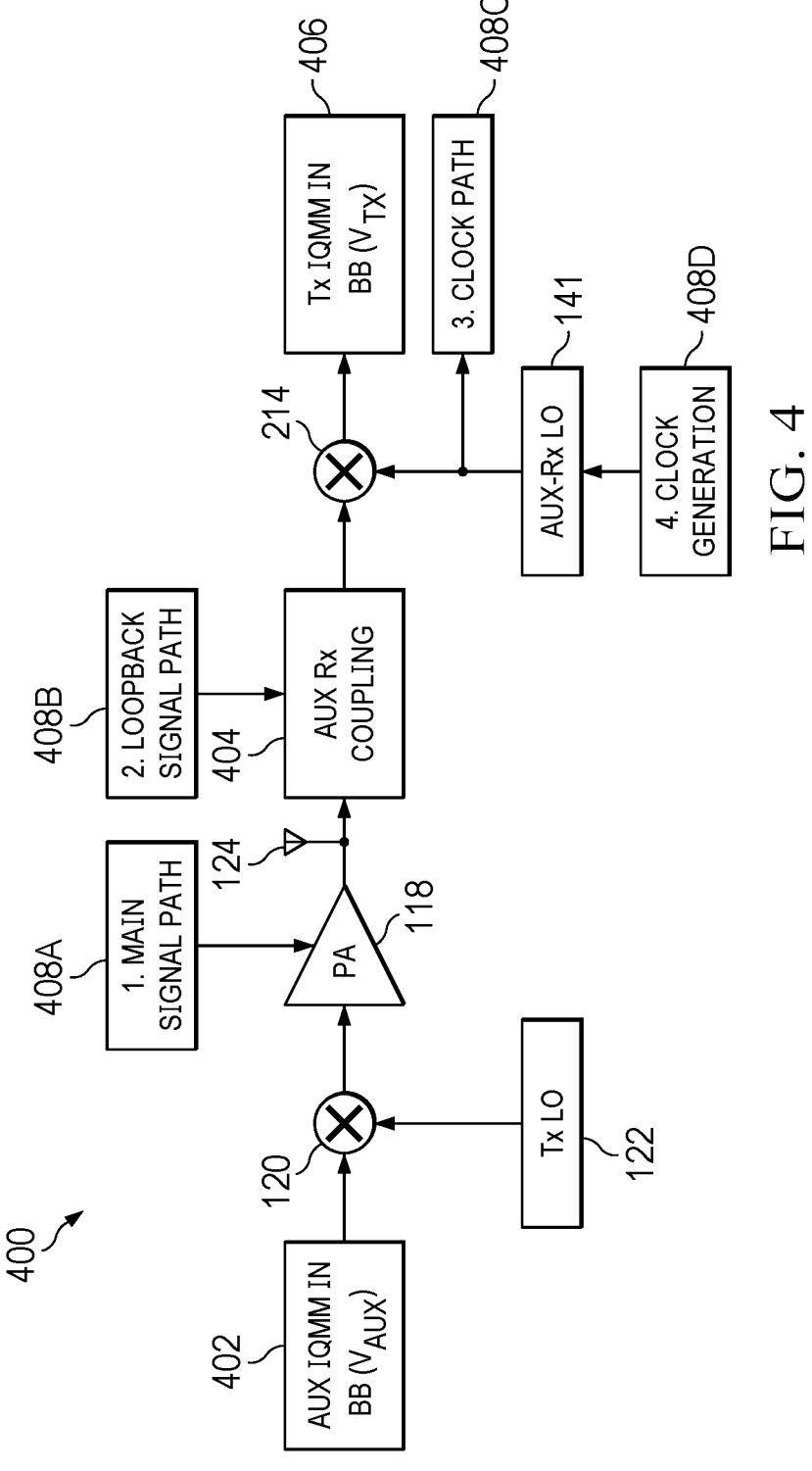
FIG. 4 is a block diagram of a partial transmitter and auxiliary receiver system in accordance with various examples.

FIG. 4 is a block diagram of a partial transmitter and auxiliary receiver system 400 in accordance with various examples. System 400 includes some components of a transmitter and auxiliary receiver path, but other systems may include components or circuitry that is not shown here for simplicity. Some components of system 400 are described above, and like numerals denote like components. In that regard, system 400 may be similar to system 100, and in some examples, system 400 is a representation of a portion of system 100.

System 400 includes PA 118, TX mixer 120, TX LO 122, antenna 124, AuxRx LO 141, and mixers 214 (e.g., mixer 138 and/or mixer 140). System 400 also includes auxiliary IQMM ($v_{AUX}$) 402, AuxRx coupling 404, and Tx IQMM ($v_{TX}$) 406. System 400 includes four locations 408A, 408B, 408C, and 408D for adding a phase delay or rotation (collectively, locations 408, or individually, location 408). Phase delays or rotations may be added in other locations or in other ways in other examples. As one example, location 408A is the main signal path. Location 408B is the loopback signal path. Location 408C is the AuxRx clock path. Location 408D is the clock generation block for the AuxRx LO 141. The hardware and/or software that produces a delay may be referred to as a delay element herein.

System 400 shows that some AuxRx IQMM 402 may be added to the signal chain in system 400. The transmit path may also add some Tx IQMM 406. The added AuxRx IQMM and Tx IQMM should be decoupled or separated to correct the Tx IQMM error. The Tx and AuxRx IQMM are decoupled by adding a phase delay or rotation at any appropriate location in system 400. As an example, location 408A adds a phase delay or rotation to the main Tx signal path, such as in PA 118 or another component of the Tx signal path. Location 408B adds a phase delay or rotation in the loopback signal path. Any suitable circuitry may be useful for adding phase delays or rotations. Location 408C adds a phase delay or rotation in the clock path for the AuxRx LO 141 (e.g., between AuxRx LO 141 and mixer 214). Location 408D adds a phase delay to the clock generation in the AuxRx, such as in the AuxRx LO 141. Any of these locations 408 may be useful for adding the phase delay or rotation. In an example, a first iteration of the process described herein estimates the Tx/AuxRx loop IQMM using a normal obtained phase delay for the signal. Then, a second iteration estimates the Tx/AuxRx loop IQMM after adding a phase delay or rotation at one of the locations 408. After these two iterations, a set of equations is solved to estimate Tx IQMM. The solution method is described below.

As shown in Equation (2) above, the signal $X=y_{BB}$ is a complex envelope baseband signal distorted with IQMM:

$$X=y_{BB}=Re(x)\cdot ae^{j\theta}+j\cdot IM(x) \tag{2}$$

This relationship may be rewritten as Equation (3):

$$y_{BB} = ae^{j\theta}\cdot\frac{[x+x*]}{2}+\frac{[x-x^*]}{2} \tag{3}$$

As also shown in Equation (3) above:

$$y_{BB} = x\frac{ae^{j\theta}+1}{2}+x^*\frac{ae^{j\theta}-1}{2} \tag{3}$$

$y_{BB}$ may be shown as Equation (4), substituting for $\alpha$ and $\beta$:

$$y_{BB}\triangleq\alpha x+\beta x^* \tag{4}$$

The RF (radio frequency) signal is given by Equation (9):

$$y_{Tx}(t)=Re\{y_{BB}\cdot e^{j\omega_c t}\} \tag{9}$$

The Tx IQMM ratio is estimated in Equation (10):

$$v_{Tx} = \frac{\beta}{\alpha} \tag{10}$$

In this example, X is the transmitted signal, and $\beta/\alpha$ represents the unwanted IQMM.

$y_{ROT}$ represents the $y_{Tx}$ signal with some rotation. A gain G is represented by a gain (A) with some rotation ($\theta$) in Equation (11):

$$G=Ae^{j\theta} \tag{11}$$

$$y_{ROT}=y_{Tx}\cdot G \tag{12}$$

Therefore, $y_{ROT}$ is the transmitted signal $y_{Tx}$ with some gain A and some rotation ($\theta$). The AuxRx input signal is given by Equation (13):

$$y_{Rx}=y_{ROT}\cdot\alpha_{Rx}+y_{ROT}{}^*\cdot\beta_{Rx} \tag{13}$$

Substituting for the $y_{ROT}$ and $y_{ROT}{}^*$ terms produces the equation for the IQMM of the loop ($v_{loop}$):

$$y_{Rx}=\alpha_{Rx}(\alpha_{Tx}x+\beta_{Tx}x^*)e^{j\theta}+\beta_{Rx}(\alpha_{Tx}{}^*x^*+\beta_{Tx}{}^*x)e^{-j\theta} \tag{14}$$

Equation (14) may be rewritten as Equation (15):

$$y_{Rx}=(\alpha_{Rx}\alpha_{Tx}e^{j\theta}+\beta_{Rx}\beta_{Tx}{}^*e^{-j\theta})x+(\alpha_{Rx}\beta_{Tx}e^{j\theta}+\beta_{Rx}\alpha_{Tx}{}^*e^{-j\theta})x^* \tag{15}$$

Equation (16) shows the relationship of $y_{Rx}$ to $\alpha$ and $\beta$:

$$y_{Rx}=\alpha x+\beta x^* \tag{16}$$

Comparing Equation (16) to Equation (15) provides the following values for $\alpha$ and $\beta$ in Equations (17) and (18):

$$\alpha=(\alpha_{Rx}\alpha_{Tx}e^{j\theta}+\beta_{Rx}\beta_{Tx}{}^*e^{-j\theta}) \tag{17}$$

$$\beta=(\alpha_{Rx}\beta_{Tx}e^{j\theta}+\beta_{Rx}\alpha_{Tx}{}^*e^{-j\theta}) \tag{18}$$

Because the IQMM of the loop $v_{loop}=\beta/\alpha$, $v_{loop}$ can be written as shown in Equation (19), with substitutions for $\beta$ and $\alpha$ from Equations (17) and (18):

$$v_{loop} = \frac{\left(\alpha_{Rx}\beta_{Tx}e^{j\theta} + \beta_{Rx}\alpha_{Tx}^{*}e^{-j\theta}\right)}{\left(\alpha_{Rx}\alpha_{Tx}e^{j\theta} + \beta_{Rx}\beta_{Tx}^{*}e^{-j\theta}\right)} \quad (19)$$

Equation (19) has two IQMM values, one for Tx ($\alpha_{Tx}$ and $\beta_{Tx}$) and one for Rx ($\alpha_{Rx}$ and $\beta_{Rx}$). The variable $\theta$ is the rotation. In FIG. 3, the Tx IQMM is introduced in Tx IQMM 308. The Rx IQMM is introduced in AuxRx IQMM 322. The variable $\theta$ is introduced in gain and rotation 316. Because both AuxRx and Tx raw IQMM are relatively low by design, $$v_{Rx} = \frac{\beta_{Rx}}{\alpha_{Rx}} \ll 1;$$

$$\text{and } v_{Tx} = \frac{\beta_{Tx}}{\alpha_{Tx}} \ll 1.$$

Therefore, $\beta_{Rx}\beta_{Tx}^{*} \ll \alpha_{Rx}\alpha_{Tx}$, and Equation (19) may be rewritten as Equation (20):

$$v_{loop} = \frac{\left(\alpha_{Rx}\beta_{Tx}e^{j\theta} + \beta_{Rx}\alpha_{Tx}^{*}e^{-j\theta}\right)}{\left(\alpha_{Rx}\alpha_{Tx}e^{j\theta}\right)} \quad (20)$$

The IQMM of the loop $v_{loop}$ is also show in Equation (21):

$$v_{loop}=v_{Tx}+v_{Rx}\cdot e^{-j(2\,arg(\alpha_{Tx}))}\cdot e^{-j(2\theta)} \quad (21)$$

Equation (21) shows that $v_{loop}$ has a $v_{Tx}$ term and a $v_{Rx}$ term. In this example, the $v_{Tx}$ term is the desired term. The $v_{Rx}$ term is due to the Rx and rotation, and should be removed so the $v_{Tx}$ term (the Tx IQMM) can be determined. The $v_{Rx}$ term may be removed by adding a phase delay or rotation as described herein. Equation (21) may be rewritten as Equation (22), which shows the IQMM $v_{loop1}$ without a rotation:

$$v_{loop1}=v_{Tx}+v_{Rx}\cdot e^{-j(2\,arg(\alpha_{Tx}))}\cdot e^{-j(2\theta)} \quad (22)$$

Adding a phase delay or rotation, $\theta_{2}=\theta+\delta$, where $\delta$ represents the phase delay or rotation, produces a $v_{loop2}$ shown in Equation (23):

$$v_{loop2}=v_{Tx}+v_{Rx}\cdot e^{-j(2\,arg(\alpha_{Tx}))}\cdot e^{-j(2(\theta+\delta))} \quad (23)$$

Equations (22) and (23) may be solved for $v_{Tx}$ to determine the Tx IQMM. There are two cases for solving for $v_{Tx}$. The first case is when $\delta$ is 90° or a multiple of 90°. The rotation $\delta$ could be set to 90° by adding a 90° delay to the clock generation in one example (location 408D, described above). The second case is when $\delta$ is another value that is not 90°, which can occur if a phase delay or rotation is added but the magnitude of the delay or rotation is unknown. In the first case, if $\delta$ is 90°, the $v_{Rx}$ term in Equation (23) becomes negative. Therefore, in this case, $v_{loop1}$ may be added to $v_{loop2}$ to get Equation (24):

$$v_{loop1}+v_{loop2}=2^{*}v_{Tx} \quad (24)$$

Equation (24) may be solved for $v_{Tx}$ to determine the Tx IQMM with Equation (25):

$$v_{Tx} = \frac{(v_{loop1} + v_{loop2})}{2} \quad (25)$$

If the value of $\delta$ is unknown, the second case may be useful. In the second case, a variable X is defined in Equation (26):

$$X=v_{Rx}\cdot e^{-j(2\,arg(\alpha_{Tx}))}\cdot e^{-j(2\theta)} \quad (26)$$

Substituting X into Equation (22) and multiplying by $e^{-j(2\delta)}$ (26) produces Equation (27):

$$v_{loop1}\cdot e^{-j(2\delta)}=v_{Tx}\cdot e^{-j(2\delta)}+X\cdot e^{-j(2\delta)} \quad (27)$$

Subtracting $v_{loop2}$ from each side of Equation (27) produces Equation (28):

$$v_{loop1}\cdot e^{-j(2\delta)}-v_{loop2}=v_{Tx}\cdot(e^{-j(2\delta)}-1) \quad (28)$$

Solving Equation (28) for $v_{Tx}$ produces Equation (29):

$$v_{Tx} = \frac{\left(v_{loop2} - v_{loop1}e^{-j(2\delta)}\right)}{1 - \left(e^{-j(2\delta)}\right)} \quad (29)$$

The IQMM $v_{Tx}$ may be found by estimating $e^{-j(2\delta)}$. Equation (20) may be rewritten as Equation (30):

$$v_{loop} = \frac{\beta_{loop}}{\alpha_{loop}} = \frac{\left(\alpha_{Rx}\beta_{Tx}e^{j\theta} + \beta_{Rx}\alpha_{Tx}^{*}e^{-j\theta}\right)}{\left(\alpha_{Rx}\alpha_{Tx}e^{j\theta}\right)} \quad (30)$$

Therefore, Equation (31) shows the value of $\alpha_{loop}$:

$$\alpha_{loop}=\alpha_{Rx}\alpha_{Tx}e^{j\theta} \quad (31)$$

The system equation is shown as Equation (32), where y is the signal received at the receiver and x is the initially transmitted signal:

$$y=\alpha_{loop}\cdot x+\beta_{loop}\cdot x^{*} \quad (32)$$

Then, cross correlation hardware accumulators are computed to calculate the IQMM $v$. These accumulators are computed with Equation (8) above. Controller 136 may perform these calculations in one example. In other examples, any suitable processor may perform the calculations. The accumulators shown below are the $x_{n}$ and $y_{n}$ components in Equation (8). The cross correlation accumulators provide the final outputs to estimate a loop $\alpha_{loop}$. With the estimation of $\alpha_{loop}$ loop for both the regular loop and the loop with a phase delay or rotation, $e^{-j(2\delta)}$ may be determined. After $e^{-j(2\delta)}$ is determined, Equation (29) may be solved for the IQMM $v_{Tx}$. Equations (33)-(37) are the cross correlation hardware accumulators:

$$\Sigma y.x=\Sigma y_{R}x_{R}-\Sigma y_{I}x_{I}+j(\Sigma y_{R}x_{I}+\Sigma y_{I}x_{R}) \quad (33)$$

$$\Sigma y.x^{*}=\Sigma y_{R}x_{R}+\Sigma y_{I}x_{I}+j(\Sigma y_{R}x_{I}-\Sigma y_{I}x_{R}) \quad (34)$$

$$\Sigma x.x^{*}=\Sigma x_{R}x_{R}+\Sigma x_{I}x_{I} \quad (35)$$

$$\Sigma x.x=\Sigma x_{R}x_{R}-\Sigma x_{I}x_{I}+2j\Sigma x_{R}x_{I} \quad (36)$$

$$\Sigma x^{*}.x^{*}=\Sigma x_{R}x_{R}-\Sigma x_{I}x_{I}-2j\Sigma x_{R}x_{I} \quad (37)$$

Using Equations (31) through (37), the $\alpha_{loop}$ for a loop without rotation and a loop with rotation may be estimated with Equations (38) and (39):

$$\alpha_{loop1}=\alpha_{Rx}\alpha_{Tx}e^{j\theta} \quad (38)$$

$$\alpha_{loop2}=\alpha_{Rx}\alpha_{Tx}e^{j\theta+\delta} \quad (39)$$

Equation (38) provides the $\alpha_{loop}$ without rotation, and Equation (39) provides the $\alpha_{loop}$ with a rotation $\delta$. After $\alpha_{loop1}$ and $\alpha_{loop2}$ are found, $e^{-j(2\delta)}$ may be determined with Equations (40) and (41):

$$\frac{\alpha_{loop1}}{\alpha_{loop2}} = e^{-j(\delta)} \tag{40}$$

$$e^{-j(2\delta)} = \left(\frac{\alpha_{loop1}}{\alpha_{loop2}}\right)^2 \tag{41}$$

As described above, after $e^{-j(2\delta)}$ is determined, Equation (29) may be solved for the IQMM $v_{Tx}$. After the IQMM $v_{Tx}$ is found, a correction signal may be produced by IQMM correction block 166 and provided to the transmit chain to correct for the Tx IQMM. This correction is agnostic to the IQMM of the AuxRx chain. Also, the operations described herein may be performed on the regular OFDM signals transmitted by the system, without the use of special non-operational transmitted signals. The operations performed herein are in the time domain, so FFT calculations are not used. FFT operations may have large area, time, and power requirements in other systems.

FIG. 5 is a flow diagram of a method 500 for estimating and correcting IQMM of a transmitter in accordance with various examples herein. The steps of method 500 may be performed in any suitable order. The hardware components described above with respect to FIGS. 1-4 may perform method 500 in some examples. Any suitable hardware, software, or digital logic may perform method 500 in some examples.

Method 500 begins at 510, where a transmitter transmits a QAM signal, where the QAM signal includes an in-phase I chain signal and a quadrature Q chain signal. The signal may be any type of QAM signal, such as Wi-Fi, radar, etc.

Method 500 continues at 520, where a receiver receives the QAM signal, where the receiver and the transmitter form a transmitter-receiver loop. An example of the transmitter-receiver loop is shown in FIG. 1 and described above.

Method 500 continues at 530, where a controller determines an IQMM of the transmitter-receiver loop without a phase delay. The process for determining the IQMM is described above. Controller 136 may perform the determination in one example.

Method 500 continues at 540, where the controller determines an IQMM of the transmitter-receiver loop with a phase delay, where the phase delay is introduced by a delay element. Controller 136 may perform the determination. The phase delay may be introduced at any of the locations 408 described above, or at any other suitable location.

Method 500 continues at 550, where the controller determines an IQMM of the transmitter based on the IQMM of the transmitter-receiver loop without the phase delay and the IQMM of the transmitter-receiver loop with the phase delay. Controller 136 may also perform this determination using the process and the equations described above.

Method 500 continues at 560, where the IQMM correction block 166 corrects the IQMM of the transmitter by providing a correction signal at an appropriate location in the transmitter. In one example, the correction signal may be provided to the inputs of DACs 108 and 110.

The examples herein may be useful for correcting Tx IQMM in any system that uses QAM for transmitting message signals. Systems that use QAM may include Wi-Fi (802.11 a/g/n/ac/ax), cellular systems (e.g., Long-Term Evolution (LTE)), radar systems, cable modems, WiMAX, digital video broadcast (DVB), and many others.

Examples herein perform estimation of the impairments in the time domain on the OFDM packets. The solution described herein is immune to AuxRx IQMM and to frequency dependent IQFD. The phase delays or rotations described herein may be achieved using any suitable techniques. As an example, a phase delay may be achieved by changing the clock generation phase of the AuxRx. In another example, a phase delay may be achieved by phase shifting the signal at the load of the transmitter amplifier in the Tx path. In another example, a phase delay may be achieved by adding an intentional delay in the AuxRx path, in either a signal path or a clock path.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A system, comprising:
   a transmitter configurable to transmit a quadrature amplitude modulation (QAM) signal, wherein the QAM signal includes an in-phase (I) chain signal and a quadrature (Q) chain signal;
   a first circuit configurable to receive the QAM signal and transmit an attenuated signal responsive the QAM signal;
   a receiver configurable to receive the attenuated signal;
   a delay element configurable to introduce a first phase delay in a transmitter-receiver loop, wherein the transmitter-receiver loop comprises the transmitter, the first circuit, and the receiver; and
   a controller configurable to:
      determine an I-Q mismatch (IQMM) of the transmitter-receiver loop with the first phase delay;
      determine an IQMM of the transmitter-receiver loop with a second phase delay, wherein the second phase delay is different than the first phase delay;
      determine an IQMM of the transmitter responsive to the IQMM of the transmitter-receiver loop with the first phase delay and the IQMM of the transmitter-receiver loop with the second phase delay; and
      produce a correction signal responsive to the IQMM of the transmitter.

2. The system of claim 1, wherein the delay element is configurable to introduce the first phase delay by changing a clock generation phase in the receiver.

3. The system of claim 1, wherein the delay element is configurable to introduce the first phase delay by using a phase shift at an amplifier in the transmitter.

4. The system of claim 1, wherein the delay element is configurable to introduce the first phase delay by adding a phase delay to a signal path in the receiver.

5. The system of claim 1, wherein the delay element is configurable to introduce the first phase delay by adding a delay to a clock path in the receiver.

6. The system of claim 1, wherein the first phase delay is a multiple of 90 degrees.

7. The system of claim 1, wherein the first phase delay decouples the IQMM of the transmitter from an IQMM of the receiver.

8. The system of claim 1, wherein the transmitter-receiver loop is configurable to provide a feedback signal to the transmitter.

9. A system, comprising:
   a transmitter having a first in-phase (I) signal chain, a first quadrature (Q) signal chain, a first mixer, and an amplifier;
   a first circuit configurable to receive a first signal from the transmitter and produce an attenuated signal responsive to the first signal;
   a receiver configurable to receive the attenuated signal and provide a feedback signal to the transmitter, wherein the receiver includes a second mixer, a second I signal chain, and a second Q signal chain, and wherein the transmitter, the first circuit, and the receiver form a transmitter-receiver loop;
   a delay element configurable to introduce a first phase delay and a second phase delay in the transmitter-receiver loop; and a controller configurable to receive the feedback signal and determine an I-Q mismatch (IQMM) of the transmitter responsive to the first phase delay and the second phase delay.

10. The system of claim 9, wherein the controller is further configurable to determine an IQMM of the transmitter by:
   determining a first IQMM of the transmitter-receiver loop with the first phase delay, wherein the first phase delay is zero;
   determining a second IQMM of the transmitter-receiver loop with the second phase delay; and
   determining the IQMM of the transmitter responsive to the first IQMM of the transmitter-receiver loop and the second IQMM of the transmitter-receiver loop.

11. The system of claim 10, wherein the controller is further configurable to:
   correct the IQMM of the transmitter by providing a correction signal to the transmitter.

12. The system of claim 9, wherein the delay element is configurable to introduce the first phase delay and the second phase delay by changing a clock generation phase in the receiver.

13. The system of claim 9, wherein the delay element is configurable to introduce the first phase delay and the second phase delay by adding a delay to a clock path in the receiver.

14. A method, comprising:
   transmitting a quadrature amplitude modulation (QAM) signal with a transmitter, wherein the QAM signal includes an in-phase (I) chain signal and a quadrature (Q) chain signal;
   attenuating the QAM signal to produce an attenuated signal;
   receiving the attenuated signal at a receiver, wherein the receiver and the transmitter form a transmitter-receiver loop;
   determining an I-Q mismatch (IQMM) of the transmitter-receiver loop with a first phase delay;
   determining an IQMM of the transmitter-receiver loop with a second phase delay, wherein the second phase delay is different than the first phase delay;
   determining an IQMM of the transmitter responsive to the IQMM of the transmitter-receiver loop with the first phase delay and the IQMM of the transmitter-receiver loop with the second phase delay; and
   producing a correction signal responsive to the IQMM of the transmitter.

15. The method of claim 14, further comprising:
   introducing the first phase delay by changing a clock generation phase in the receiver.

16. The method of claim 14, further comprising:
   introducing the first phase delay by phase shifting the QAM signal in a signal path in the transmitter.

17. The method of claim 14, further comprising:
   introducing the first phase delay by adding a phase delay to a signal path in the receiver.

18. The method of claim 14, further comprising:
   introducing the first phase delay by adding a delay to a clock path in the receiver.

19. The method of claim 14, wherein the receiver is configurable to provide a feedback signal to the transmitter.

20. The method of claim 14, wherein the first phase delay is introduced between a mixer in the transmitter and a mixer in the receiver.

21. The method of claim 14, wherein the second phase delay has a value of 0.

22. The method of claim 14, wherein the method is performed in real-time.

23. The method of claim 14, wherein the QAM signal is transmitted via an antenna.

* * * * *